US012780755B2

(12) United States Patent
Nugent et al.

(10) Patent No.: US 12,780,755 B2
(45) Date of Patent: Nov. 3, 2026

(54) ENCAPSULATED FERTILIZER POD AND METHOD OF USE

(71) Applicant: Bethel Farms, Inc., Arcadia, FL (US)

(72) Inventors: William E Nugent, Arcadia, FL (US); Tyler W. Nugent, Arcadia, FL (US)

( * ) Notice: Subject to any disclaimer, the term of this patent is extended or adjusted under 35 U.S.C. 154(b) by 480 days.

(21) Appl. No.: 18/234,419

(22) Filed: Aug. 16, 2023

(65) Prior Publication Data

US 2025/0059109 A1 Feb. 20, 2025

(51) Int. Cl.

| | |
|---|---|
| ***C05F 11/02*** | (2006.01) |
| ***C05G 1/00*** | (2006.01) |
| ***C05G 5/00*** | (2020.01) |
| ***C05G 5/12*** | (2020.01) |

(52) U.S. Cl.

CPC ................ *C05G 5/45* (2020.02); *C05F 11/02* (2013.01); *C05G 1/00* (2013.01); *C05G 5/12* (2020.02)

(58) Field of Classification Search

CPC .. C05F 11/02; C05G 5/45; C05G 1/00; C05G 5/12

See application file for complete search history.

(56) References Cited

U.S. PATENT DOCUMENTS

| | | | | |
|---|---|---|---|---|
| 4,014,675 | A * | 3/1977 | Osburn | C05G 5/14 71/64.11 |
| 10,870,608 | B1 * | 12/2020 | Smith | C05F 11/00 |
| 2017/0275212 | A1 * | 9/2017 | Forte | C05B 17/00 |
| 2020/0079704 | A1 * | 3/2020 | Yadav | C05C 9/005 |
| 2021/0300837 | A1 * | 9/2021 | Blanchard | C05G 5/45 |

* cited by examiner

*Primary Examiner* — Wayne A Langel

(74) *Attorney, Agent, or Firm* — Adrienne Love

(57) ABSTRACT

An encapsulated fertilizer that is made up of a water-soluble film having a compartment containing a pre-selected amount of fertilizer granules. The fertilizer granules include at least three nutrients, including nitrogen, phosphorous and potassium and are selected to target specific types of plants. Each fertilizer granule has a low salt index and is in a stable, non-leachable form. For proper manufacture, each fertilizer granule have aspect ratios dissimilar to 1 and low Sieve Grading Number. The water-soluble film pod is able to dissolve rapidly when exposed to an amount of water at a temperature of above 35 degrees Fahrenheit.

22 Claims, 19 Drawing Sheets

FERTILIZER POD DISSOLUTION TIMES AT VARYING TEMPERATURES (SECONDS)

| Water Temp (°F) | $Seconds_{avg}$ | 1 | 2 | 3 |
|---|---|---|---|---|
| 35 | 26.0 | 26.1 | 24.6 | 27.2 |
| 45 | 8.8 | 8.1 | 10.7 | 7.65 |
| 55 | 8.3 | 10.1 | 8 | 6.7 |
| 65 | 5.5 | 6.1 | 5.2 | 5.1 |
| 75 | 3.7 | 3.3 | 3.4 | 4.5 |
| 85 | 2.9 | 3 | 3.2 | 2.6 |
| 95 | 2.2 | 2.6 | 2.1 | 1.8 |

FIGURE 16

ENCAPSULATED FERTILIZER POD AND METHOD OF USE

1. FIELD OF THE INVENTION

This invention relates to fertilizer encapsulated in a pre-measured water soluble film and its method of use. The associated composition of fertilizer is specifically useful for securing fertilizer in a water soluble capsule for releasing nutrients into soil for plant growth.

2. DESCRIPTION OF THE RELATED ART

Fertilizers are any material that are applied to soil or to plant tissues to ensure that the plant has adequate nutrients to thrive. The application of fertilizers to plants varies considerably. Fertilizers can be applied in a solid or liquid form. Solid fertilizer is typically granulated or powdered. Granulated fertilizers can release nutrients gradually into the soil in a controlled-release. Often liquid fertilizers are diluted with another liquid, such as water, and can be applied rapidly through irrigation water or by spraying. These types of fertilizers are typically used by large commercial crop farmers rather than a home gardener. Fertilizer products for individual non-commercial gardeners are often messy, time consuming, wasteful and inaccurate.

Proper plant nutrition is required for desirable results in the landscape. There is often a decline in plant performance after retail sale due to improper fertilization. Overuse of fertilizers can damage plants and underuse may result in decreased success of the consumer's plants. Additionally, fertilizer may be improperly analyzed or result in improper fertilizer release curves. Even if fertilizers are measured accurately, unused fertilizer may spill or be loose in an open bag. Accessible or inhalable fertilizer can be dangerous for pets or small children. It is therefore advantageous to create a product that contains a pre-measured, encapsulated amount of fertilizer that can be properly tailored to a plant type.

This problem has been addressed in the past with various fertilizer methods of delivery. An example of a prior art method includes controlled-release granular fertilizer. The prior art fertilizer must still be measured and applied accurately. Additionally, the prior art fertilizer is not in a self-contained capsule or pod. Even where prior art fertilizer has been contained, the fertilizer has not been in a capsule that allows for easy and simple application.

Therefore, what is needed is an encapsulated fertilizer and method of using the same that provides for the simple and efficient delivery of the proper amount of fertilizer at the proper rate. The present system achieves these objectives, as well as others that are explained in the following description.

BRIEF SUMMARY OF THE INVENTION

The embodiment of the fertilizer pod consists of premeasured granular including plant nutrients and a soil enhancement granule which is all sparged with a fertilizer use efficiency additive. Multiple versions of the fertilizer pod have been developed with differences in size to accommodate various plant sizes and differences in ratios of ingredients to create specific fertilizer analyses for many plant types. All base ingredients are present in all variations of fertilizer pods, but in differing amounts and ratios. The premeasured amount of granular fertilizer is fully encapsulated in a water-soluble film. The film is cold water-soluble polyvinyl alcohol, or PVOH. Although the film is referred to as cold water soluble, it dissolves at all water temperatures. The intended use of the invention is in conjunction with the planting of containerized plants in the landscape. Following excavation of the hole for placement of the plant, the appropriately selected fertilizer pod is placed in the hole prior to inserting the root ball of the plant. The PVOH film encapsulating the granules is designed to dissolve immediately under standard planting practices of watering in new plantings. The encapsulated fertilizer design imparts ease of use and personal safety to the end user. Upon pod dissolution, the granules provide the designed plant performance and environmental risk reduction.

BRIEF DESCRIPTION OF THE SEVERAL VIEWS OF THE DRAWINGS

FIG. 16 is a table showing the encapsulated fertilizer pod dissolution times at varying temperatures.

REFERENCE NUMERALS IN THE DRAWINGS

10 encapsulated fertilizer pod
12 film
14 fertilizer granules

DETAILED DESCRIPTION OF INVENTION

The present invention is an encapsulated fertilizer and method of using the same. An amount of fertilizer granules are completely encapsulated by a water-soluble film by the process of thermoforming. The design criteria for the encapsulated fertilizer account for maximum performance across all categories and types of plants.

Figure 18:
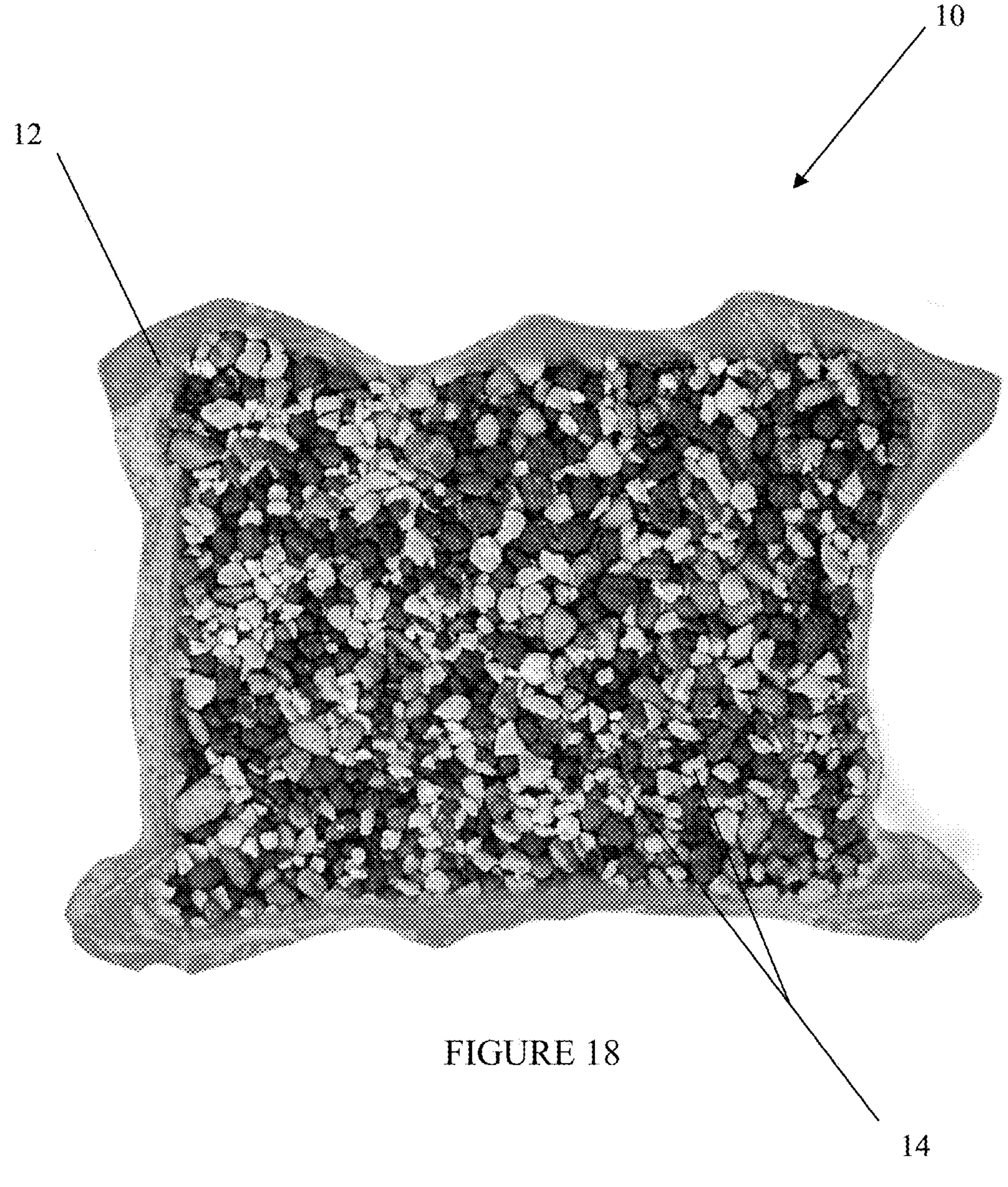
FIG. 18 is a perspective view, showing the encapsulated fertilizer pod containing a fertilizer blend.

The encapsulated fertilizer pod 10 is shown in FIG. 18. A water-soluble film 12 fully encapsulates and seals an amount of fertilizer granules 14 within the film. In the present example, film 12 is formed by sealing an upper layer and lower layer around the fertilizer granules 14, collectively the fertilizer blend. The fertilizer granules 14 are visible through the thin water-soluble film 12. The encapsulated fertilizer components, or fertilizer granules, are selected based on size and allow for encapsulation in a pod (enclosed completely around the fertilizer granules) instead of a pouch (not fully enclosed, typically enclosed on three sides). In general, fertilizer granules are available in various diameters. The granule sizing is quantified by the 'Sieve Grading Number', or SGN. The SGN of granular fertilizers typically ranges from 80 to 300. A granular fertilizer with an SGN of 100 will have an average granule diameter of 1 millimeter (SGN equals average granule diameter in millimeters multiplied by 100). The components, or granules, that comprise the present encapsulated fertilizer pod are preferably in the range of an SGN from 100 SGN to 120 SGN, placing it in the smaller size range of most granular fertilizers. This use of low SGN materials imparts the characteristic of flowability which enables the pod fill step of the manufacturing process. Larger SGN materials create erratic flow behavior and excessive spillage within the pod fill machinery. Larger SGN materials are suited only to pouch type containment. Selecting fertilizer components with SGN sizing in the 100 to 200 range enables containment in the pod type packaging.

Selection of fertilizer granules based on shape is also important for encapsulation in a pod instead of a pouch. Fertilizer granules have been selected for the encapsulated fertilizer pod based on the shape of the granules. The method of utilizing more angular granules over more spherical granules imparts handling characteristics necessary within the pod filling machinery. The aspect ratio of a granule is calculated by dividing its length by its width. An aspect ratio close to 1 is considered spherical. The materials specified for use in the fertilizer pod invention have aspect ratios dissimilar to 1. In other words, the granules are not spherical. The shape of fertilizer granules 14 can also be seen in FIG. 18. Increased angularity of granules eliminates excessive spillage in the pod fill process thereby allowing for the commercial production of pods. The spillage of material from the machinery is caused simply by the granules bouncing out of the machines and onto the floor. This bouncing occurs at an acceptable rate using angular materials. This bouncing occurs at an unacceptable rate using spherical materials. Spherical granules distribute stress evenly when they collide with a surface. The impact force is concentrated at a single point on the surface, which allows the granule to rebound more effectively. In contrast, angular granules have irregular contact points with the surface, leading to uneven stress distribution and decreased rebounding ability. Fertilizer granules with low tendency to bounce are suitable for pod fill and pouch fill machinery. Fertilizer granules with a high tendency to bounce are suitable only for pouch fill machinery. The selection of fertilizer granules with angular properties enables containment in the pod type packaging. The pod type packaging fully encapsulates the fertilizer granules such that there is no opening on any area of the pod itself. The pod itself can have variable dimensions and weight. As an example, in one embodiment the weight of the pod is 11 grams.

Encapsulated fertilizer granules in a pod instead of a pouch elicits stronger consumer confidence of dissolution performance and reliability based on pod familiarity across various existing consumer applications. Established commercial pod applications include laundry soaps, dish soaps, household cleaners and agricultural chemicals. Consumers possess a level of confidence that a pod will dissolve as advertised and subsequently release its contents. This ultimately results in confidence that the contents of the pod will be made available to perform the designated task. Alternatively, water soluble pouches are flattened bags, sealed on three sides. Existing consumer confidence of pouch performance in terms of water solubility is limited or non-existent. Test groups when presented with a pouch tend towards the pinch and pull tear open method thus voiding the intended application method. The use of a pod versus a pouch allows for greater success during use of the encapsulated fertilizer pod.

The pod is formed by a cold water-soluble polyvinyl alcohol (PVOH) film which encapsulates the fertilizer granules enabling package dissolution and nutrient release across actual soil temperatures in which plants grow globally. The water soluble film is considered highly soluble in water temperatures as low as 40° F. Solubility in water temperatures approaching 32° F. remains highly reliable. Fertilizer pod dissolution testing substantiates these claims and are available in FIGS. 16 and 17. In contrast, fertilizer pouch products intended for similar use as the current fertilizer pod invention utilize a hot water-soluble pouch which requires temperatures between 106° F. to 176° F. for dissolution. Soil temperatures are generally optimal for plant growth in the range of 68° F. to 86° F. Cool-season (C3) plants prefer cooler soil temperatures in the range of 50° F. to 68° F. Warm-season (C4) plants prefer warmer soil temperatures in the range of 77° F. to 95° F. Extreme soil temperatures below 41° F. slow root growth and plant metabolism. Extreme soil temperatures above 95° F. can cause wilt, heat stress and damage to plant tissues. The water-soluble film used will dissolve in water temperatures above 32° F. The specific selection of water-soluble film ensures product performance across the complete temperature range possible for plant growth.

The selection of the water-soluble film also enables package dissolution and subsequent nutrient release immediately following exposure to water. The encapsulated fertilizer pod is intended to dissolve and expose contents to the soil environment immediately following planting of the containerized plant. With adequate soil moisture, the dissolution reliably occurs in less than one minute. In testing, the average dissolution time was 24 seconds at water temperatures of 35° F. The cold-water soluble film utilized provides for immediate dissolution and nutrient implementation.

The specific water-soluble film utilized also allows for predictable and reliable plant nutrient release curves beginning immediately at planting date. The encapsulated fertilizer pod has been designed for specific and precise performance. The plant nutrition components within the pod contain slow-release materials therefore prolonged restraint due to containment within the film is unwanted and unnecessary. The goal of predictable and reliable nutrient release curves that initiate at planting is achieved due to the method of cold-water soluble film selection that imparts dissolution independent of soil temperature and geography. Therefore, a water-soluble film that is quick to dissolve is important to the present encapsulated fertilizer.

The manner in which the fertilizer is contained in the pod and its manner of use provides a level of human protection as it relates to inhalation hazard. Granular fertilizers can pose inhalation risks to people during handling and application. Inhalation of particulates could lead to acute and/or systemic respiratory issues. The containment of the present fertilizer in a pod encapsulates particulates and eliminates the inhalation potential and subsequent health risks for the end user.

Additionally, the fertilizer containment in a pod provides a level of human protection as it relates to skin contact and absorption. Direct skin contact with fertilizer can cause irritation, sensitization, and allergic reactions. Contact can also result in absorption into the bloodstream, either directly through the skin or indirect transfer from hands to mouth during eating, drinking, etc. The containment of the fertilizer components within the water-soluble film prevents direct contact and subsequent health risks.

Finally, the fertilizer containment in a pod provides a level of human protection as it relates to eye irritation. Dry fertilizer particulates can plausibly contact the eyes during application through improper handling or wind currents. The result of fertilizer dusts contacting the eyes can be eye irritation, corneal abrasion, chemical conjunctivitis, infection, and corrosive damage. The containment of the fertilizer components within the water-soluble film prevents direct eye contact and subsequent health risks.

The encapsulated fertilizer pod provides a variety of benefits for plants. The use of the present encapsulated fertilizer pod mitigates nutrient burn to the plant by using the selected fertilizer granules described herein.

Figure 19:
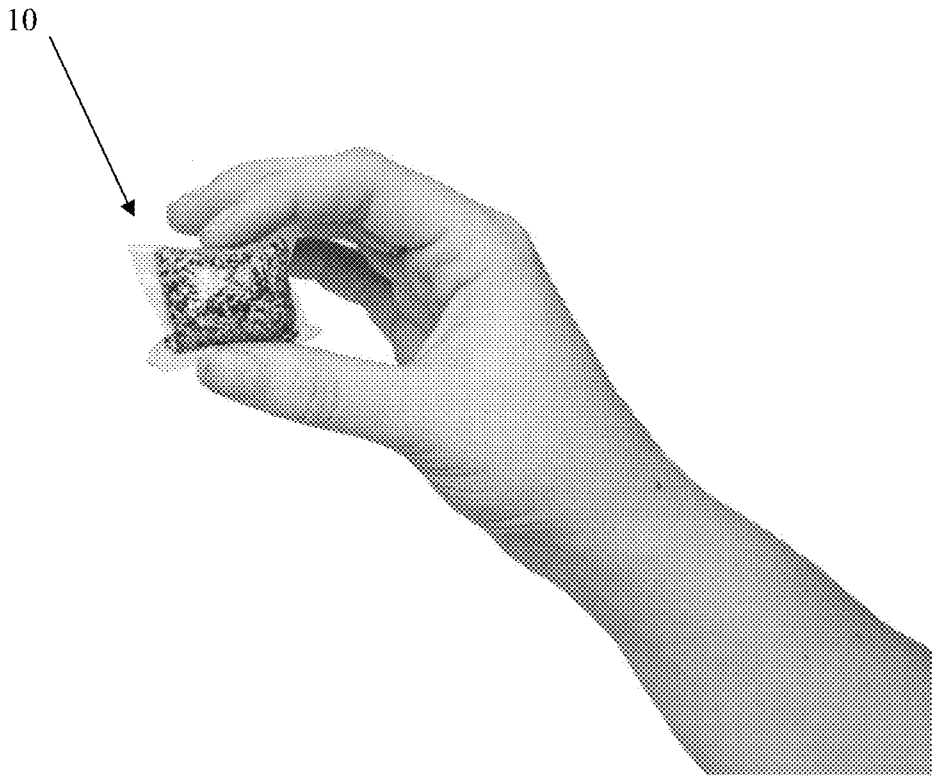
FIG. 19 is a perspective view, showing a user holding the encapsulated fertilizer pod containing a fertilizer blend.

The user can pick up and deposit the pod easily, efficiently and cleanly, as shown in FIG. 19. To utilize the encapsulated fertilizer pod the user places the pod beneath the root ball of the containerized plant at planting. This placement results in high concentrations of fertilizer at a single point as the nutrients cannot be distributed across the entire soil area. Placement of prior art fertilizers in this manner creates the potential for a spike in soil salinity in close proximity to the root ball. The related plant effects include excessive nutrient concentrations in the leaf tissue, an osmotic differential causing dehydration and leaf burn ranging from brown tips to fully necrotic leaves. The scenario described can range in severity from no plant injury to plant death. The present fertilizer granules contained within the fertilizer pod are selected to eliminate this risk and ensure no detrimental effects to the plant. Qualities of the fertilizer pod ingredients that ensure the plants are not negatively impacted include very low salt indices, slow-release nutrients, organic nutrients, cation exchange increasing amendments and fertilizer use efficiency additives. These features create a low salt, slow-release fertilizer pod that feeds the plant for an extended period while eliminating the detrimental effects possible when point source concentrations of fertilizer are high. In contrast, a pod of soluble fertilizer of high salt index and immediate plant availability when placed near the root ball will likely cause moderate to severe nutrient burn to the plant. Trials of the present encapsulated fertilizer pod showed zero plant burn. Specific ingredients and their characteristics are described herein. Incorporating these materials allows for proper plant nutrition without negative plant responses such as nutrient burn.

The encapsulated fertilizer granules, or components of the fertilizer blend, are selected to promote rapid root development. All nutrients contribute to plant growth, both root and shoot growth. Phosphorous is especially important in root growth. In a new planting of a containerized plant, fast and robust rooting into the native soil is critical for nutrient and water uptake. Proper rooting provides stability and anchorage to the new plant. Rooting enables quick acclimation to the new environment to minimize the inherent stresses related to transplanting. Long term success of the planting is maximized through proper rooting. Proper rooting is supported by incorporating phosphorous nutrition within the encapsulated fertilizer pod.

The present encapsulated fertilizer pod application provides increased plant growth versus alternatives. The use of the present encapsulated fertilizer pod significantly increases plant growth and quality compared to the absence of fertilizer.

Fertilizer components that break down slowly provide uniform and extended plant nutrition. The immediate dissolution of the water-soluble film in the present encapsulated fertilizer pod exposes the slow-release fertilizer components to the soil environment. The nutrients provided in the fertilizer granules are in a stable, non-leachable form. Moderated plant feeding begins on day one and continues through a minimum of day forty-five. In contrast, conventional prior art fertilizer is highly soluble causing immediate plant uptake at high rates. Nutrient burn risk and leaching of nutrients is elevated. The effects of conventional prior art fertilizers are short-lived and often harm plants. Utilizing slow-release fertilizer granules, such as the granules used in the encapsulated fertilizer pod, reliably feeds plants starting immediately and continuing for an extended duration.

The present encapsulated fertilizer pod can be tailored to specific plant types, sizes and group. Therefore, there are multiple embodiments of the specific combination of fertilizer granules utilized based on the plant type. The use rate, or total amount of fertilizer contained within each pod has been pre-determined for each plant type. Plant types have differing fertilizer rate requirements. Certain plants are considered ‘heavy feeders’ and require a larger amount of plant food. Examples of these plants would be tomatoes, corn and roses. Other plants are considered ‘light feeders’ and require lower amounts of plant food. Examples of these plants would be succulents, mint and zinnias. Under feeding a heavy feeder causes reduced plant growth and quality. Over feeding a light feeder causes nutrient burn and poor quality. Prescribing accurate fertilizer use rates based on plant type provides optimal growth and avoids the detrimental effects of insufficient or excessive nutrition. The encapsulated fertilizer pod is capable of being adapted to include more or less of one or more of the fertilizer components within the pod depending on the specific targeted plant.

The use rate can also be pre-determined based on plant size. Containerized plants are sold in numerous sizes. Common plant sizing includes 4 inch pots, 1 quart pots, 1 gallon pots, 3 gallon pots and 7 gallon pots. Larger plants are capable of and require increased nutrient uptake. The fertilizer pods are sized according to the plant size. Predetermining use rates based on plant size minimizes use rate errors by the consumer and ensures sufficient plant feeding.

Finally, the use rate can be pre-determined after a proper fertilizer analysis based on plant type group. The present encapsulated fertilizer pod embodies numerous fertilizer analyses which are specific to the plant type groups outlined herein. The fertilizer analysis refers to the percentage of nitrogen, phosphate, and potash in the fertilizer blend, which consists of an amount of fertilizer granules. The necessary ratio between these numbers differs based on plant type. Optimal growth is achieved by providing the correct analysis based on plant type. For example, a grass plant exhibits rapid vegetative growth and thrives on a higher nitrogen analysis. In contrast, flowering plants do not require fertilizer with a high nitrogen ratio compared to phosphate and potash. High nitrogen in flowering plants can cause excess vegetative growth at the expense of the flowers. Specific plant analyses for differing plant types is achieved with the fertilizer pod system.

Fertilizer pod ingredients and application methods are also designed to avoid environmental harm. The nutrients contained within the present encapsulated fertilizer pod should persist in the target area until eventual uptake by and assimilation into the intended plant. Negative impacts to the environment are possible when nutrients leave the target site. Such environmental impacts include water eutrophication, algal blooms, fish kills, groundwater contamination, soil degradation and air pollution. The method of using the present encapsulated fertilizer pod contained in this section are intended to avoid such negative impacts.

The method of application placement eliminates loss of nutrients to surface water runoff. The present method of using the encapsulated fertilizer pod involves the steps of identifying the desired plant, providing the pre-determined encapsulated fertilizer pod for that plant, excavating the hole, placing the fertilizer pod at the bottom of the hole, placing the plant in the hole, backfilling and firming the hole and watering in the new plant. The encapsulated fertilizer pod is physically secured in the soil. Excessive hand watering, irrigation and rainfall are thus incapable of washing the fertilizer away from the target site. The nutrients remain in place to await plant uptake. In contrast, the prior art fertilization method of surface application of fertilizer granules at planting is vulnerable to nutrient movement outside of the target site. This occurs when heavy irrigation or rainfall occurs in the days or weeks following application. The step of initial placement of the encapsulated fertilizer pod adjacent to and below the root zone, along with the specific selection of fertilizer granules described herein, prevents nutrient loss to surface water movement and soil erosion.

The present encapsulated fertilizer pod and method of using the same eliminates loss of nutrients to the atmosphere. Prior art surface applied fertilizers are susceptible to atmospheric loss. This occurs through volatilization, denitrification, and wind erosion. The step of placing the encapsulated fertilizer pod beneath the plant isolates nutrients from the atmosphere, eliminating atmospheric loss.

The selection of fertilizer granules that break down slowly to eliminate vertical leaching of nutrients to outside the root zone also prevents loss of nutrients to the surrounding environment. The organic nutrients used in the encapsulated fertilizer pod are water insoluble thus do not dissolve in and move with soil water. On the other hand the use of water soluble nutrients would allow for lateral or downward movement. Lateral or downward movement of soluble nutrients of even a few inches places the nutrients outside the reach of the target plant's roots. The target plant does not receive sufficient nutrition and plant vigor and quality will be reduced. The slow release and organic forms of nutrition used in the present encapsulated fertilizer pod are described herein and ensure the plant nutrition remains available for target plant uptake. The selection of slow release fertilizer granules within the encapsulated fertilizer pod ensures longevity in the root zone.

The selection of fertilizer granules that break down slowly also eliminates vertical leaching of nutrients into groundwater. Water insoluble and therefore non-mobile nutrients in the encapsulated fertilizer pod are unable to move the distances required to enter the groundwater. Soluble nutrients in prior art fertilizer readily move into groundwater when present at sufficient levels during times of increased rainfall or irrigation. The selection of slow release and organic nutrition within the encapsulated fertilizer pod is to prevent groundwater contamination.

The selection of fertilizer granules for the encapsulated fertilizer pod that increase cation exchange capacity minimizes nutrient leaching. Cation exchange capacity (CEC) refers to negatively charged sites in the soil capable of holding positively charged plant nutrients, or cations. Such cations include $Ca^{2+}$, $Mg^{2+}$, $K^{+}$, $NH^{4+}$, $Fe^{2+}$, $Fe^{3+}$, $Mn^{2+}$, $Zn^{2+}$, $Cu^{2+}$, $Ni^{2+}$, $Co^{2+}$, etc. High CEC soils retain plant nutrients to minimize losses to leaching while also increasing plant availability. Humic acid possesses high numbers of negatively charged functional groups and greatly contributes to soil CEC. The fertilizer pod granules include a selection of humic granules to serve as a CEC booster. The use of humic granules increase soil CEC and reduce nutrient leaching.

The selection of fertilizer granules for the present encapsulated fertilizer pod are also sourced from industry by-products to minimize landfill waste. Waste reduction and resource conservation are achieved by utilizing industry by-products in place of newly produced goods. A large proportion of the fertilizer pod is comprised of granules such as Nature Safe® 8-3-5 and Milorganite® 6-2-0 (both described herein). Nature Safe® 8-3-5 is derived from recycled by-products of the food industry. Milorganite® 6-2-0 is pelletized bio solids derived metropolitan wastewater treatment. The method of utilizing by-products contributes to resource conservation and waste reduction.

Finally, the use of polyvinyl alcohol (PVOH) water soluble film eliminates environmental risk of pollution. The film used in the fertilizer pod is colorless, odorless, non-toxic and biodegradable. Biodegradation occurs through microbial degradation with the end result being $H_2O$ and $CO_2$. This results in zero contributions to microplastics. Microplastics are tiny plastic particles, typically measuring less than 5 millimeters in size, that are the result of the degradation or fragmentation of larger plastic items or the direct release of small plastic particles, causing environmental concerns due to their widespread presence and potential impact on ecosystems. The method of utilizing PVOH water soluble film eliminates environmental risk and the contribution to microplastics in the ecosystem.

The analysis of a fertilizer is a sequence of three numbers which refer to the percentage of nitrogen (N), phosphorous (P) and potassium (K) in the fertilizer. N, P and K are the macronutrients and along with any micronutrients, additives and fillers comprise the fertilizer. Choosing an appropriate fertilizer analysis for the targeted plant type is critical to meet its unique nutrient needs and to promote optimal growth. In general, high nitrogen fertilizers benefit vegetative growth, high phosphorous fertilizers support rooting and flowering and high potassium fertilizers support fruiting, vigor, and water relations within the plant. Various embodiments of the fertilizer pod provide distinct fertilizer analyses to promote success for the specified plant type. The present method of using an encapsulated fertilizer pod ensures optimal plant health, productivity, and performance. Plant type categories listed below have been prescribed fertilizer pod nutrition with unique analyses tailored to its specific needs. The pre-selection of specific fertilizer pod nutrition, or specific fertilizer granules that equate to the fertilizer pod nutrition, for specified plant types are described herein.

The encapsulated fertilizer pod and method of use allows for the selection of fertilizer pod nutrition suitable to turfgrass plants. In some embodiments of the encapsulated fertilizer pod the analysis for turfgrass plants is 17-1-10 and formulated using the fertilizer granules described herein. Target species within the turfgrass plant category include but are not limited to Bermuda grass (*Cynodon* spp.), zoysiagrass (*Zoysia* spp.), St. Augustine grass (*Stenotaphrum secundatum*), centipede grass (*Eremochloa ophiuroides*), common carpet grass (*Axonopus fissifolius*), tropical carpetgrass (*Axonopus compressus*), Kentucky Bluegrass (*Poa pratensis*), fine fescues (*Festuca* spp.), tall fescue (*Festuca arundinacea*), perennial ryegrass (*Lolium perenne*) and bent grasses (*Agrostis* spp.).

The encapsulated fertilizer pod and method of use allows for the selection of fertilizer pod nutrition suitable to vegetable plants. In some embodiments of the encapsulated fertilizer pod the analysis for vegetable plants is May 8, 2010 and formulated using the fertilizer granules described herein. Target species within the vegetable plant category include but are not limited to tomatoes (*Solanum* spp.), onions (*Allium cepa*) and pepper (*Capsicum* spp.).

The encapsulated fertilizer pod and method of use allows for the selection of fertilizer pod nutrition suitable to flowering annual plants. In some embodiments of the encapsulated fertilizer pod the analysis for flowering annual plants is 5-8-8 and formulated using fertilizer granules described herein. Target species within the flowering annual plant category include but are not limited to *impatiens* (*Impatiens walleriana*), geranium (*Pelargonium* X *hortorum*) and *begonia* (*Begonia semperflorens*).

The encapsulated fertilizer pod and method of use allows for the selection of fertilizer pod nutrition suitable to perennial plants. In some embodiments of the encapsulated fertilizer pod the analysis for perennial plants is 8-2-8 and formulated using the fertilizer granules described herein. Target species within the perennial plant category include but are not limited to penta (*Pentas lanceolata*), daylily (*Hemerocallis fulva*) and lavender (*Lavandula angustifolia*).

The encapsulated fertilizer pod and method of use allows for the selection of fertilizer pod nutrition suitable to flowering shrub plants. In some embodiments of the encapsulated fertilizer pod the analysis for flowering shrub plants is Dec. 3, 2012 and formulated using the fertilizer granules described herein. Target species within the flowering shrub plant category include but are not limited to indian hawthorn (*Rhaphiolepis indica*), *Ixora* (*Ixora coccinea*) and *gardenia* (*Gardenia jasminoides*).

The encapsulated fertilizer pod and method of use allows for the selection of fertilizer pod nutrition suitable to woody shrub plants. In some embodiments of the encapsulated fertilizer pod the analysis for woody shrub plants is 12-2-8 and formulated using the fertilizer granules described herein. Target species within the woody shrub plant category include but are not limited to *viburnum* (*Viburnum* spp.), boxwood (*Buxus* spp.) and *ligustrum* (*Ligustrum* spp.).

The encapsulated fertilizer pod and method of use allows for the selection of fertilizer pod nutrition suitable to palm plants. In some embodiments of the encapsulated fertilizer pod the analysis for palm plants is Aug. 2, 2012 and formulated using the fertilizer granules described herein. Target species within the palm plant category include but are not limited to *areca* palm (*Dypsis lutescens*), *roebelinii* palm (*Phoenix roebelinii*) and queen palm (*Syagrus romanzoffiana*).

The encapsulated fertilizer pod and method of use allows for the selection of fertilizer pod nutrition suitable to *citrus* plants. In some embodiments of the encapsulated fertilizer pod the analysis for *citrus* plants is Jul. 3, 2010 and formulated using the fertilizer granules described herein. Target species within the *citrus* plant category include but are not limited to orange (*Citrus sinensis*), lime (*Citrus aurantifolia*) and lemon (*Citrus limon*).

The encapsulated fertilizer pod and method of use allows for the selection of fertilizer pod nutrition suitable to tropical plants. In some embodiments of the encapsulated fertilizer pod the analysis for tropical plants is 9-9-9 and formulated using the fertilizer granules described herein. Target species within the tropical plant category include but are not limited to croton (*Codiceum* spp.), *arboricola* (*Schefflera arboricola*) and *cordyline* (*Cordyline* spp.).

The encapsulated fertilizer pod and method of use allows for the selection of fertilizer pod nutrition suitable to rose plants. In some embodiments of the encapsulated fertilizer pod the analysis for rose plants is 6-8-8 and formulated using the fertilizer granules described herein. Target species within the rose plant category include but are not limited to knockout rose, drift rose and *grandiflora* rose (*Rosa* spp.).

The encapsulated fertilizer pod and method of use allows for the selection of fertilizer pod nutrition suitable to hibiscus plants. In some embodiments of the encapsulated fertilizer pod the analysis for hibiscus plants is 9-3-6 and formulated using the fertilizer granules described herein. Target species within the hibiscus plant category include all hibiscus (Hibiscus spp.) species.

The encapsulated fertilizer pod and method of use allows for the selection of fertilizer pod nutrition suitable to deciduous tree plants. In some embodiments of the encapsulated fertilizer pod the analysis for deciduous tree plants is 12-10-8 and formulated using the fertilizer granules described herein. Target species within the deciduous tree plant category include but are not limited to maple (*Acer* spp.), elm (*Ulmus* spp.) and oak (*Quercus* spp.).

The encapsulated fertilizer pod and method of use allows for the selection of fertilizer pod nutrition suitable to coniferous tree plants. In some embodiments of the encapsulated fertilizer pod the analysis for coniferous tree plants is 10-6-6 and formulated using the fertilizer granules described herein. Target species within the coniferous tree plant category include but are not limited to spruce (*Picea* spp.), bald cypress (*Taxodium distichum*) and pine (*Pinus* spp.).

The encapsulated fertilizer pod and method of use allows for the selection of fertilizer pod nutrition suitable to flowering tree plants. In some embodiments of the encapsulated fertilizer pod the analysis for flowering tree plants is 6-12-8 and formulated using the fertilizer granules described herein. Target species within the flowering tree plant category include but are not limited to poinciana (*Delonix regia*), dogwood (*Cornus* spp.) and *magnolia* (*Magnolia* spp.).

The encapsulated fertilizer pod and method of use allows for the selection of fertilizer pod nutrition suitable to fern plants. In some embodiments of the encapsulated fertilizer pod the analysis for fern plants is 8-6-8 and formulated using the fertilizer granules described herein. Target species within the fern plant category include but are not limited to Kimberly fern (*Nephrolepis obliterata*), Boston fern (*Nephrolepis exaltata*) and sword fern (*Nephrolepis biserrate*).

The encapsulated fertilizer pod and method of use allows for the selection of fertilizer pod nutrition suitable to perennial ornamental grass plants. In some embodiments of the encapsulated fertilizer pod the analysis for perennial ornamental grass plants is 14-4-10 and formulated using the fertilizer granules described herein. Target species within the perennial ornamental grass plant category include but are not limited to fountain grass (*Pennisetum setaceum*), muhly grass (*Muhlenbergia capillaris*) and *miscanthus* grass (*Miscanthus* spp.).

The encapsulated fertilizer pod and method of use allows for the selection of fertilizer pod nutrition suitable to bulb plants. In some embodiments of the encapsulated fertilizer pod the analysis for bulb plants is Jun. 10, 2010 and formulated using the fertilizer granules described herein. Target species within the bulb plant category include but are not limited to amaryllis (*Hippeastrum hybridum*), *caladium* (*Caladium* spp.) and lilies (*Lilium* spp.).

The encapsulated fertilizer pod and method of use allows for the selection of fertilizer pod nutrition suitable to bromeliad plants. In some embodiments of the encapsulated fertilizer pod the analysis for bromeliad plants is 6-4-6 and formulated using the fertilizer granules described herein. Target species within the bromeliad plant category include but are not limited to *Guzmania bromeliad* (*Guzmania* spp.), *Neoregelia bromeliad* (*Neoregelia* spp.) and *Fasciata* bromeliad (*Aechmea fasciata*).

The encapsulated fertilizer pod and method of use allows for the selection of fertilizer pod nutrition suitable to succulent plants. In some embodiments of the encapsulated fertilizer pod the analysis for succulent plants is 4-8-8 and formulated using the fertilizer granules described herein. Target species within the succulent plant category include but are not limited to *euphorbia* (*Euphorbia* spp.), *mammillaria* (*Mammillaria* spp.) and *peruvianus* (*Trichocereus peruvianus*).

The encapsulated fertilizer pod has a unique selection of fertilizer granules. The fertilizer granules can differ dependent on a number of factors including but not limited to the size and type of plant the user desires to fertilize. Fertilizer granule (or raw material) selection is based on providing effective plant nutrition and growth, efficient use of applied plant nutrition, low plant burn potential, low nutrient leaching potential, slow release of nutrients, use of industrial by-products to reduce landfill waste, enhancement of soil cation exchange capacity, enhancement of soil biology, enhancement of soil organic matter. Several types of raw materials for use as fertilizer granules are described below. However, these materials are merely examples of acceptable fertilizer granules and should not limit the scope of the raw materials that can be used as fertilizer granules, unless as fixed by the following claims. Importantly, the fertilizer blend (or collection of fertilizer granules selected to be encapsulated in the pod) have a salt index between 25 and 40. In contrast, most fertilizers' salt index falls between 75 and 100.

The fertilizer blend is generally comprised of the fertilizer granules listed and described below. The amount and proportions of the granules can differ based on the type of plant that is being targeted. A controlled release methylene urea nitrogen source (granule) is included in the fertilizer blend. This granule can be the Meth-Ex® 40-0-0 Chip, supplied by Lebanon Seaboard Corporation, a Pennsylvania corporation. This material contains 33.50% slow-release nitrogen. It is a low salt index material therefore low plant burn potential. It is a source of plant nitrogen to support vegetative plant growth.

A granule derived from methylene urea, urea and sulfate of potash is utilized in the fertilizer blend, such as ProScape® 20-0-25 100% Expo® Chip, supplied by Lebanon Seaboard Corporation, a Pennsylvania corporation. The Expo® 20-0-25 Chip contains 17.00% slow-release nitrogen. It is a low salt index material therefore low plant burn potential. It is a source of plant nitrogen to support vegetative plant growth. It is a source of potassium to support healthy water and nutrient movement within the plant.

The fertilizer blend also includes a fertilizer granule made up of recycled meat, bone and blood and feather meal and langbeinite. An example of one such fertilizer granule source is the Nature Safe® 8-3-5, trademark owned by Griffin Industries, LLC, product supplied by Darling Ingredients, Inc. This material contains 6.84% slow-release Nitrogen. The slow release of nutrients lasts 7-8 weeks. It is a low salt index material therefore low plant burn potential. It is comprised of water insoluble plant nutrition to minimize nutrient leaching. The source materials contained in this product are by-products of the food industry therefore reducing landfill waste.

An ammonium dihydrogen phosphate (ADP) is also provided in the fertilizer blend. The monoammonium phosphate 10-40-0 35 is a source of nitrogen to promote plant vegetative growth. This is a source of phosphorous to promote plant root growth and energy regulation within the plant cells.

A sulfate of potash is provided in the fertilizer blend for the present encapsulated fertilizer pod. Sulfate of potash is a source of potassium to promote plant water use efficiency. It is a low salt index material therefore there is a low plant burn potential.

The fertilizer blend includes a granule that is a source of nitrogen and phosphorous with a release curve of 8-12 weeks, such as Milorganite® Classic 6-2-0, supplied by Milorganite (owned by Milwaukee Metropolitan Sewerage District). It is a low salt index material therefore low plant burn potential. This material is sourced from sewage wastewater recycling therefore reducing landfill waste.

The fertilizer blend includes a source of magnesium to promote chlorophyll in the plant, such as Granusol® Magnesium, supplied by Prince Minerals, LLC. And a source of minor elements required for healthy plant growth, such as Granusol® Turf Mix, also supplied by Prince Minerals, LLC.

A carboxylic acid formulation is sparged onto each fertilizer granule in the fertilizer blend to increase fertilizer use efficiency by the plant. An example of such a material is Asset® RS, supplied by Helena Agri-Enterprises, LLC.

Finally, a low-dust granule with humic compounds is provided in the fertilizer blend in order to improve nutrient efficiency and strengthen plant growth. An example of such a product is the Resurge™ Professional Humic Granule, supplied by Helena Agri-Enterprises, LLC. This material increases the soil cation exchange capacity (CEC). An increased CEC in soils can minimize nutrient losses to leaching, maximize nutrient holding capacity, maximize longevity of fertilizer application, minimize negative plant effects from elevated soil salinity conditions and support healthy soil biology which greatly benefits plant growth.

EXAMPLES

Example 1

Figure 1:
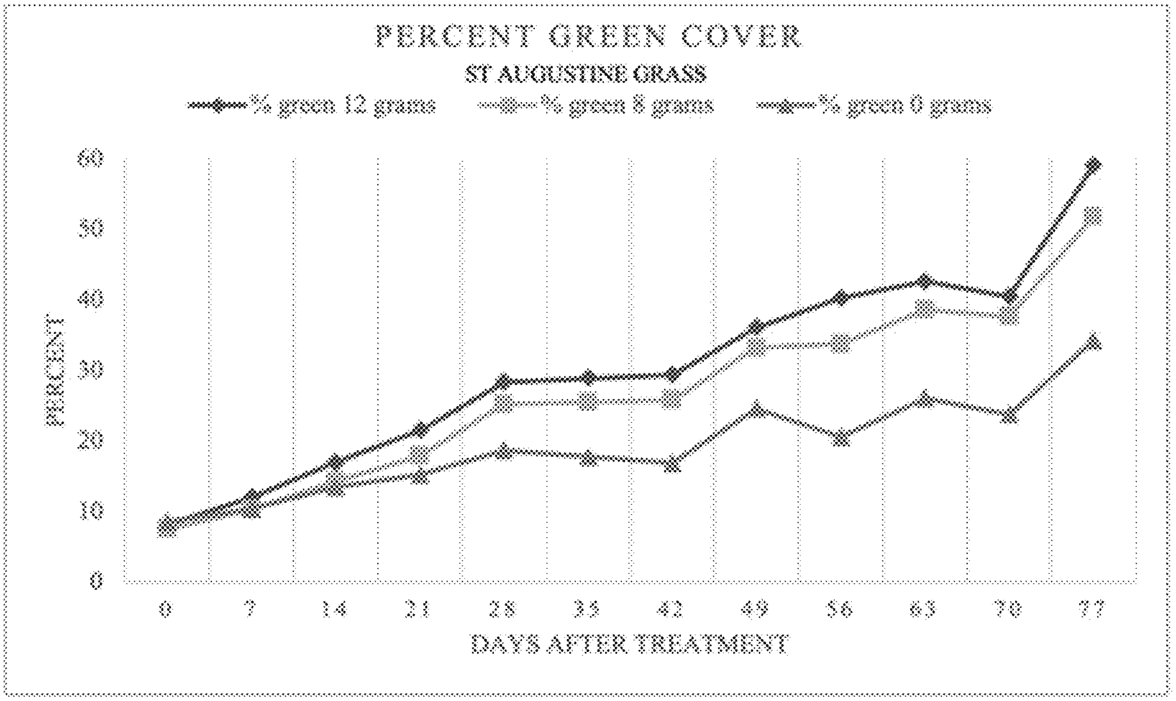
FIG. 1 is graphical representation showing the effects of treatments on percent green cover in St. Augustine grass in one example.
Figure 2:
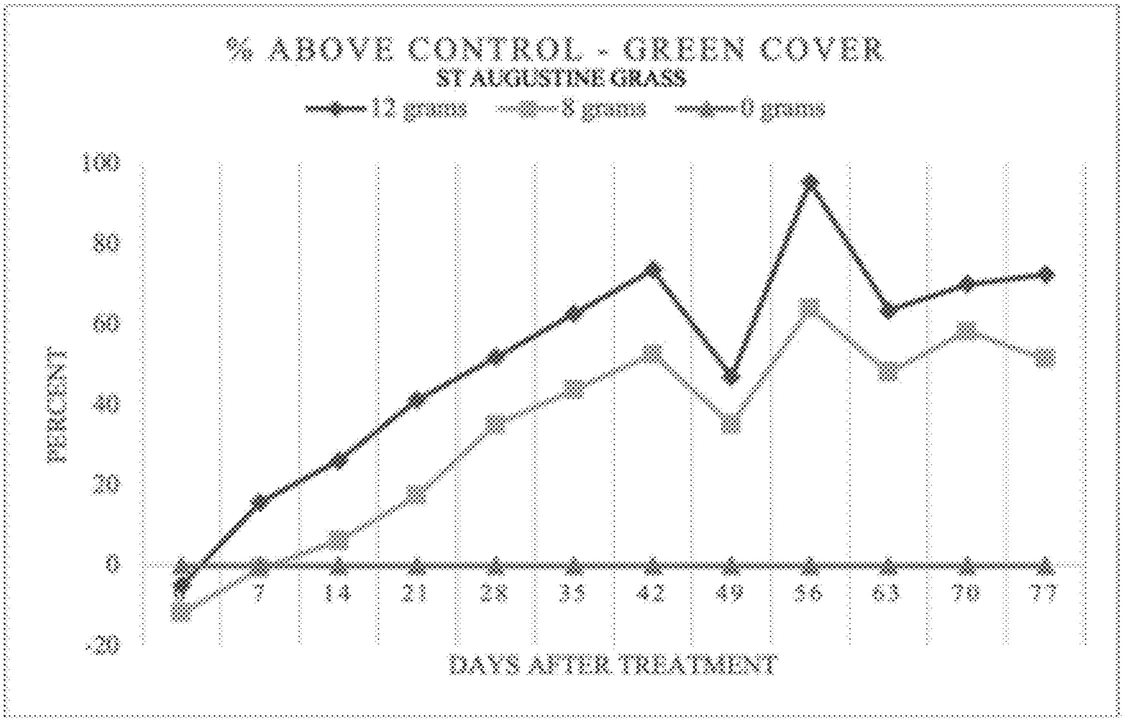
FIG. 2 is a graphical representation comparing the treatments to the untreated control as a percentage above control in one example.
Figure 3:
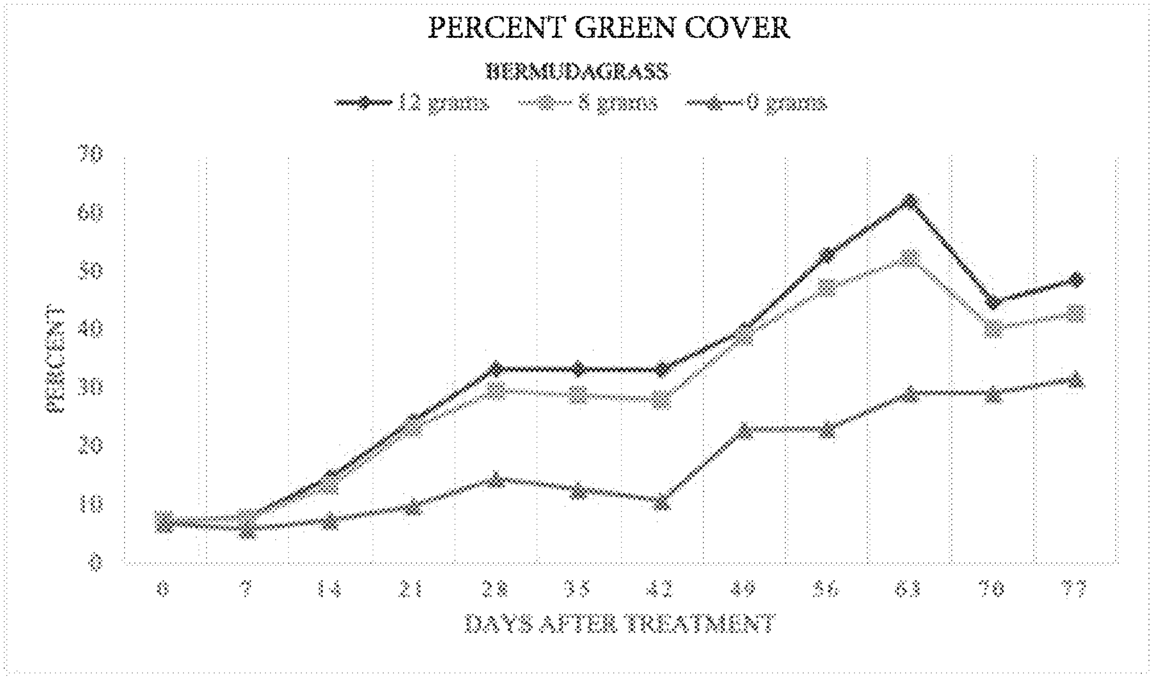
FIG. 3 is a graphical representation showing the percent green cover of Bermuda grass by the days after treatment in one example.
Figure 4:
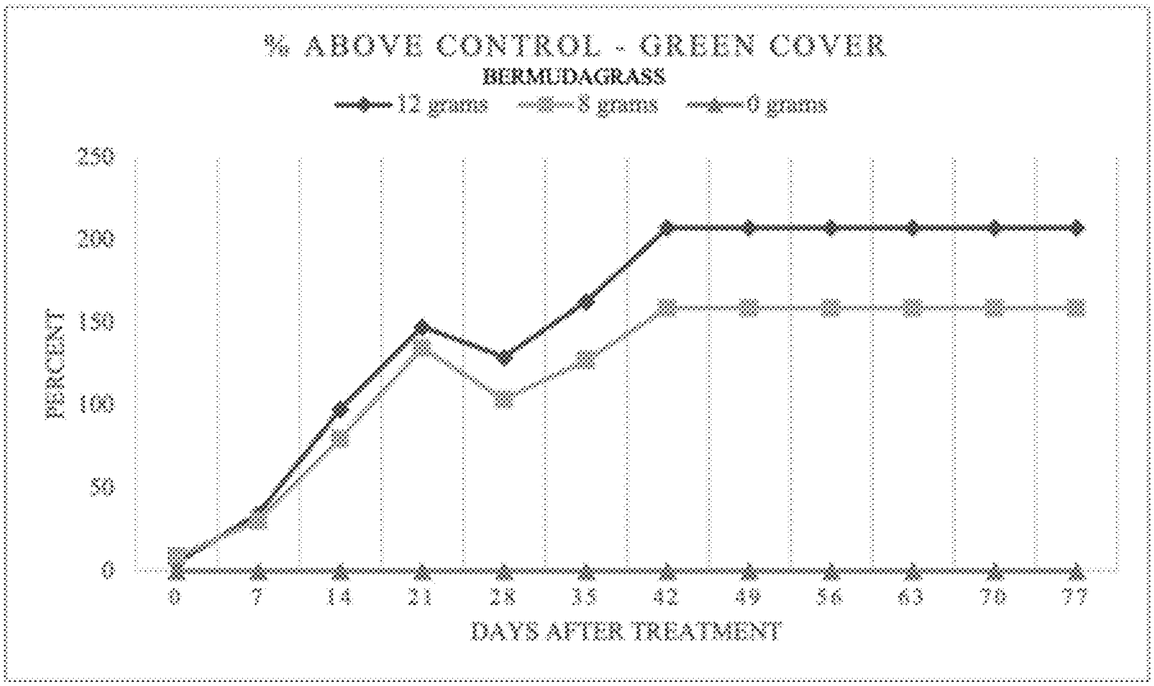
FIG. 4 is a graphical representation showing the treatments plotted on the percent above control of Bermuda grass by the days after treatment in one example.
Figure 5:
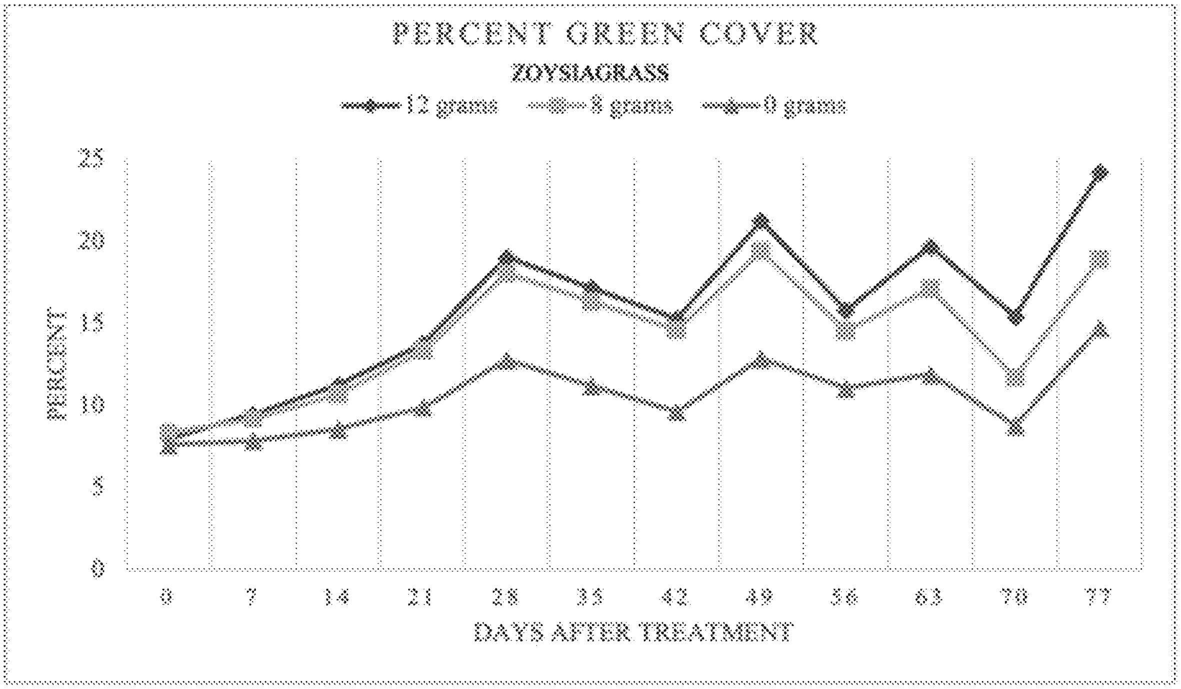
FIG. 5 is a graphical representation showing the percent green cover of *zoysia* grass by the days after treatment in one example.
Figure 6:
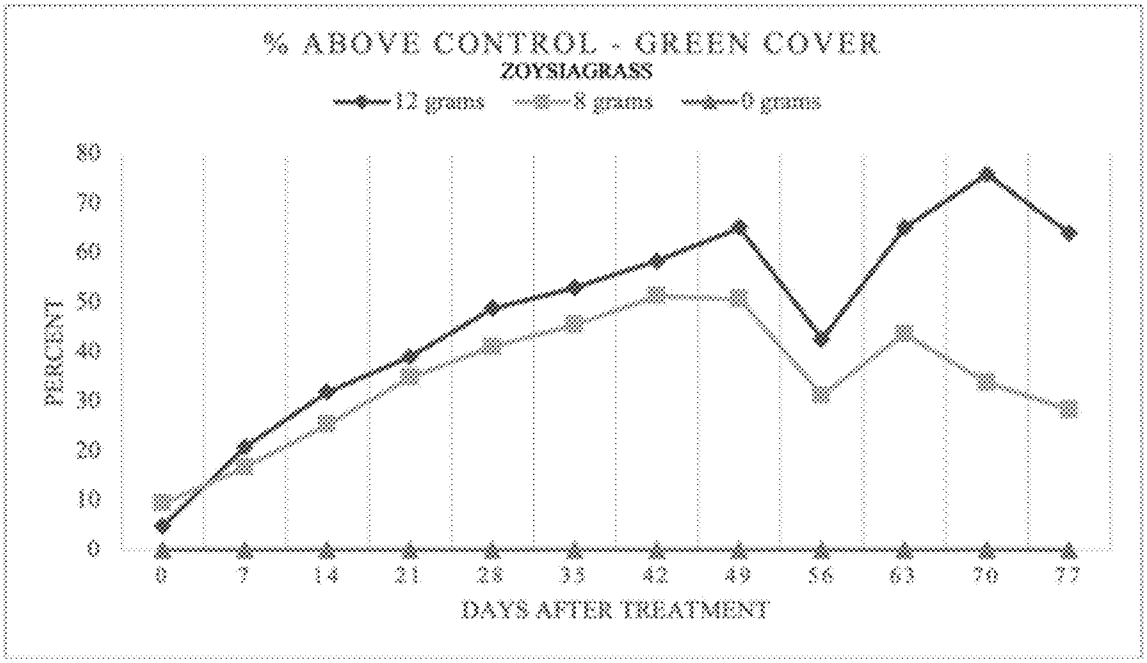
FIG. 6 is a graphical representation showing the percent above control of *zoysia* grass by the days after treatment in one example.
Figure 7:
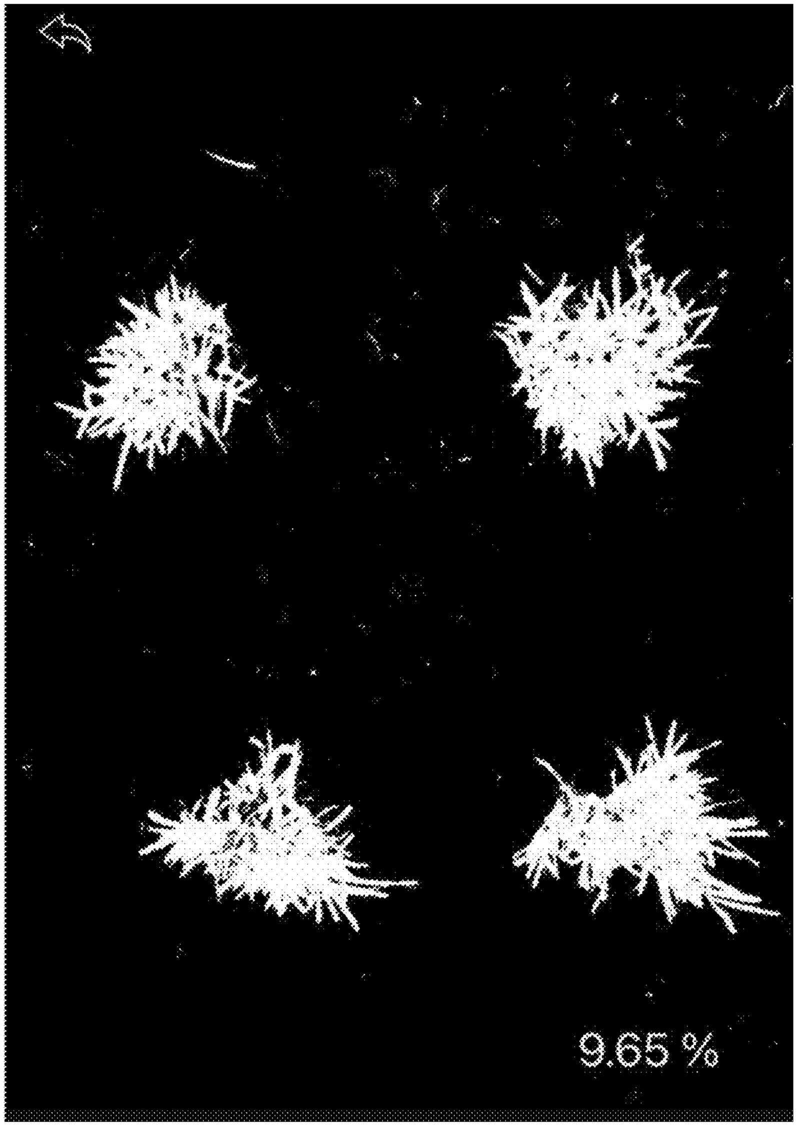
FIG. 7 is an image showing 9.65% green cover on the planting date, obtained through digital image analysis.
Figure 8:
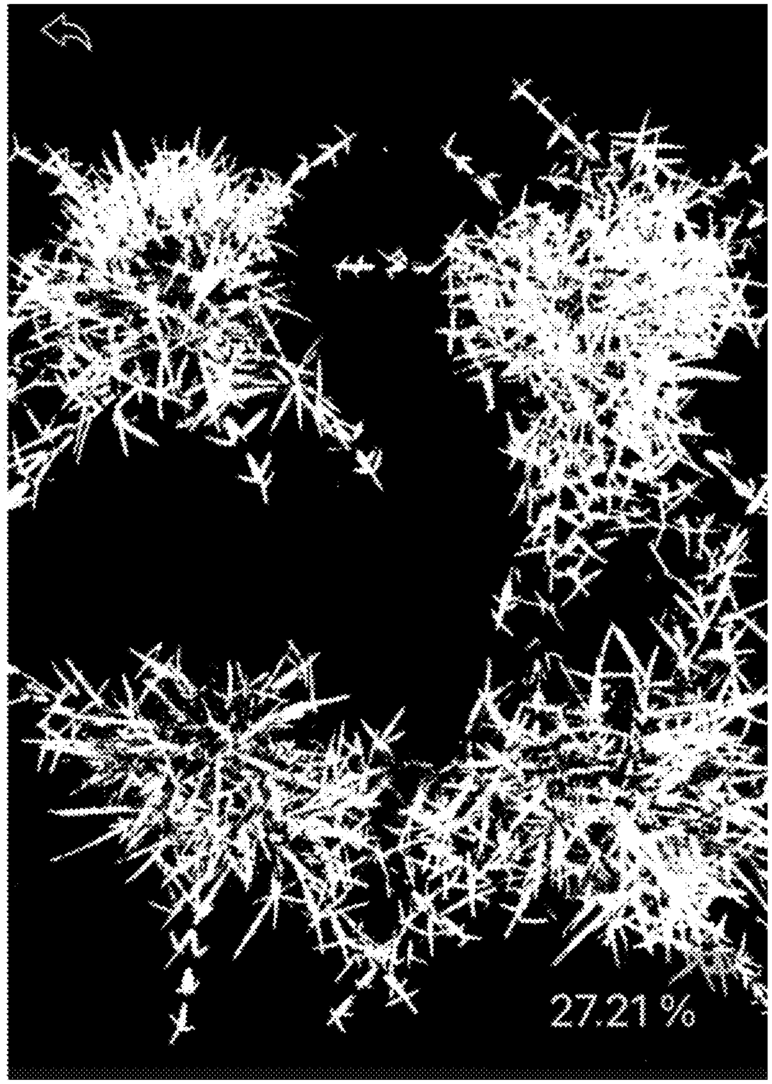
FIG. 8 is an image showing 27.21% green cover, six weeks after planting, obtained through digital image analysis.
Figure 9:
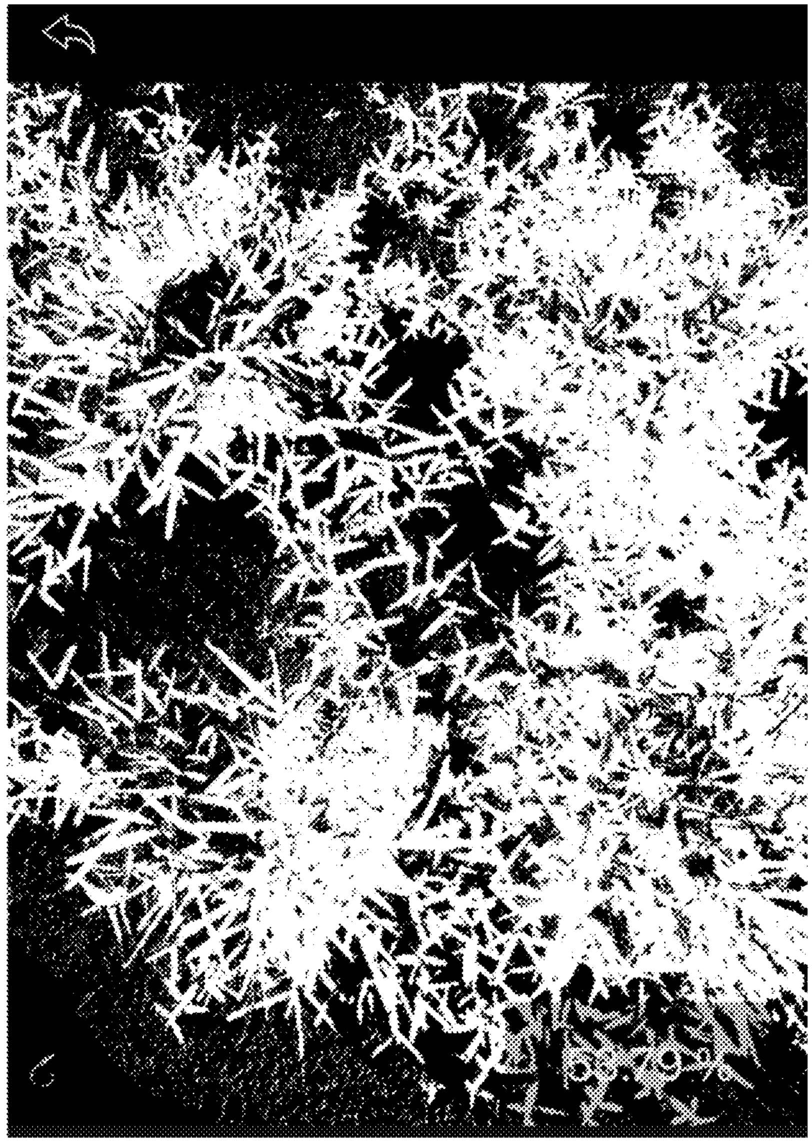
FIG. 9 is an image showing 53.79% green cover eleven weeks after planting, obtained through digital image analysis.

Example 1 shows the effects of the encapsulated fertilizer pod use on the growth rate of three different warm-season turfgrass species. Field trials were conducted on turfgrass plugs in summer of 2021. The turfgrass species tested were Floratam St. Augustine grass (*Stenotaphrum secundatum*), Bimini Bermuda grass (*Cynodon dactylon*) and Icon *zoysia* grass (*Zoysia macrostaycha*). Each species comprised its own test arranged in a randomized complete block design (RCBD) having five replications. Two sets of data points, '% green cover' and 'color', were recorded at planting and every seven days thereafter for a duration of 11 weeks. The individual plot size was 36 inches by 28 inches and contained four 3 inch by 3 inch turfgrass plugs centered in each quadrant of the plot. Treatments within each of the five replications included a 12 gram fertilizer pod of analysis 17-1-10 under each plug, an 8 gram fertilizer pod of analysis 17-1-10 under each plug and an unfertilized control. Growth rate was measured as '% Green Cover' obtained as a percentage through digital image analysis. The percentage of green pixels within the digital image of each plot represents the percentage of grass coverage of that plot. FIG. 1 shows the effects of treatments on percent green cover in St. Augustine grass. Significant differences were shown between all treatments. The percentage green cover was highest for all treatments at 77dat (days after treatment) with 12 grams being 59.1%, 8 grams being 51.9% and untreated being 34.3% covered. FIG. 2 compares the treatments to the untreated control as a percentage above control. The 12 gram treatment resulted in a 95.5% increase above untreated control at 56 dat. The 8 gram treatment resulted in a 64.1% increase above untreated control at 56 dat. FIGS. 3 through 6 represent percent green cover of Bermuda grass, percent above control of Bermuda grass, percent green cover of *zoysia* grass and percent above control of *zoysia* grass, respectively. FIG. 7, FIG. 8, and FIG. 9 show pictures of the digital image analysis software used to capture the percent green cover data. FIG. 7 shows 9.65% green cover on the planting date, where the green cover is shown in white through the digital image analysis. Six weeks after planting the image shown in FIG. 8 was taken, showing 27.21% green cover. Finally, FIG. 9 was taken eleven weeks after planting, showing 53.79% green cover. In summary, the fertilizer pod invention has been shown to improve plant growth vs unfertilized plants.

Example 2

Figure 10:
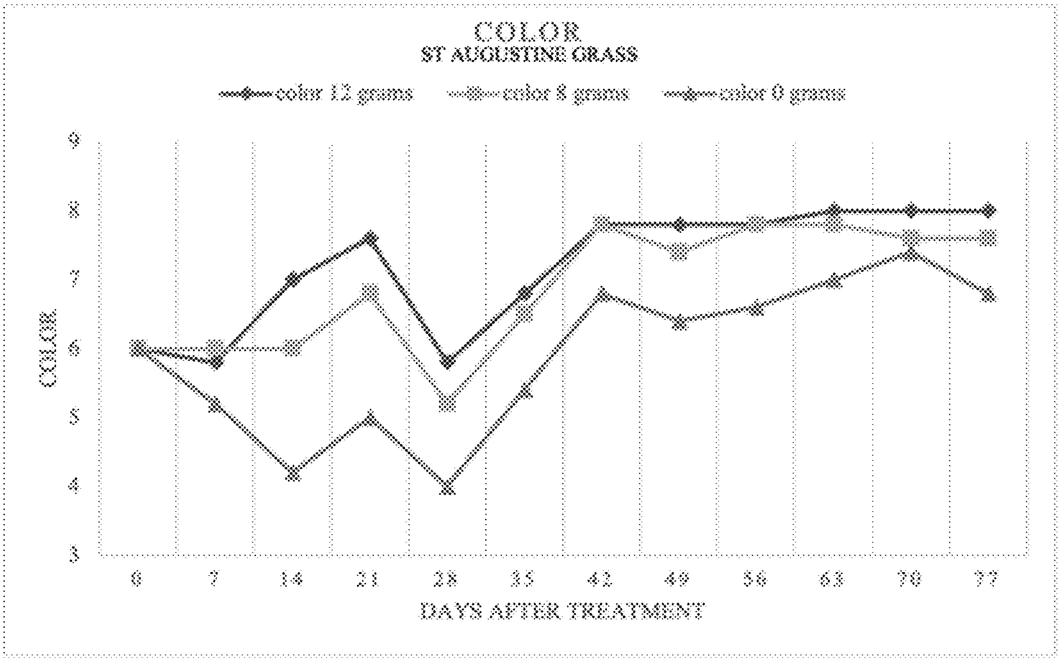
FIG. 10 is a graphical representation showing the different treatments of St. Augustine grass plotted by color versus days after treatment in one example.
Figure 11:
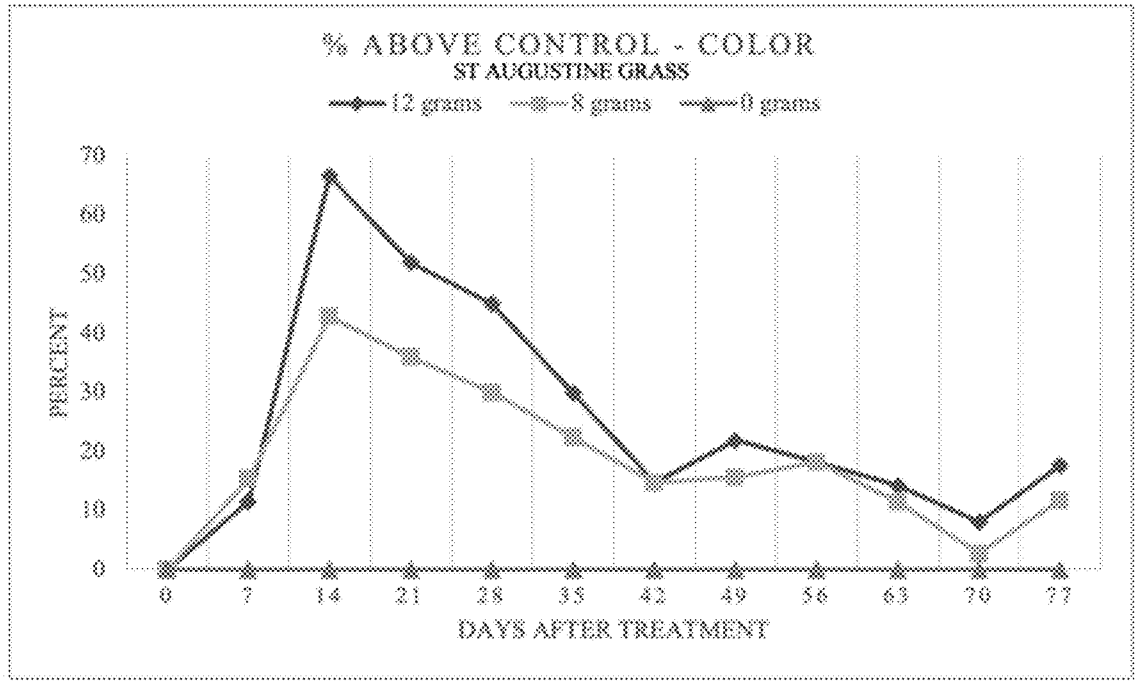
FIG. 11 is a graphical representation showing the different treatments of St. Augustine grass plotted by percent above control versus days after treatment in one example.
Figure 12:
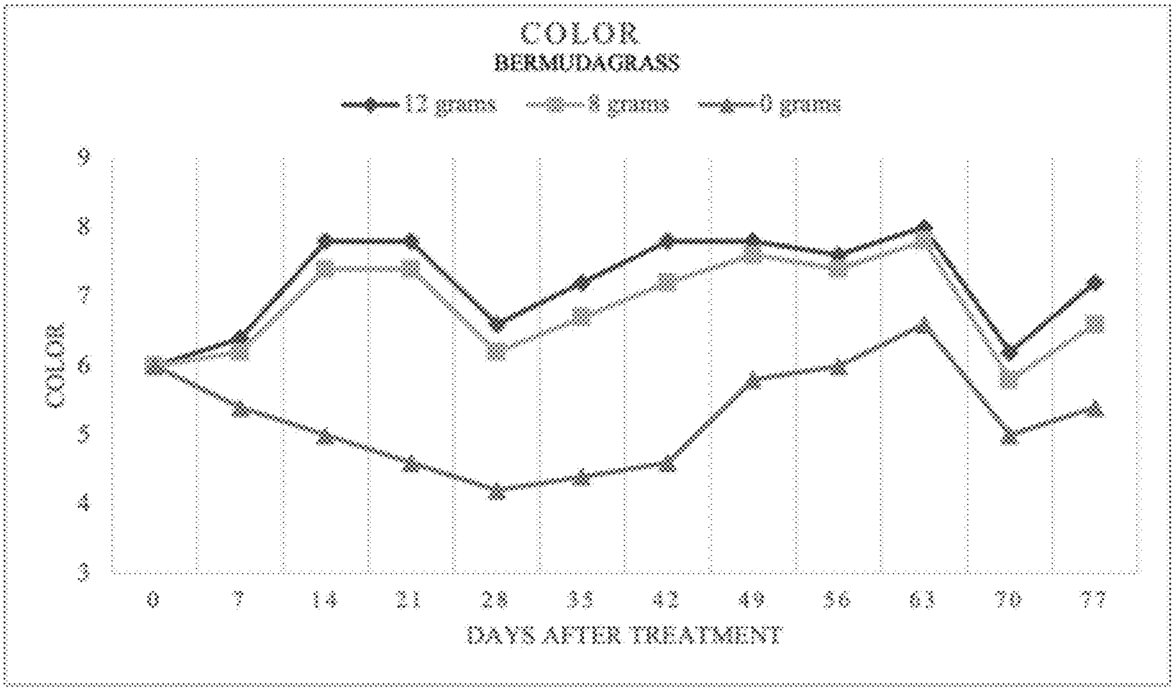
FIG. 12 is a graphical representation showing the different treatments of Bermuda grass plotted by color versus days after treatment in one example.
Figure 13:
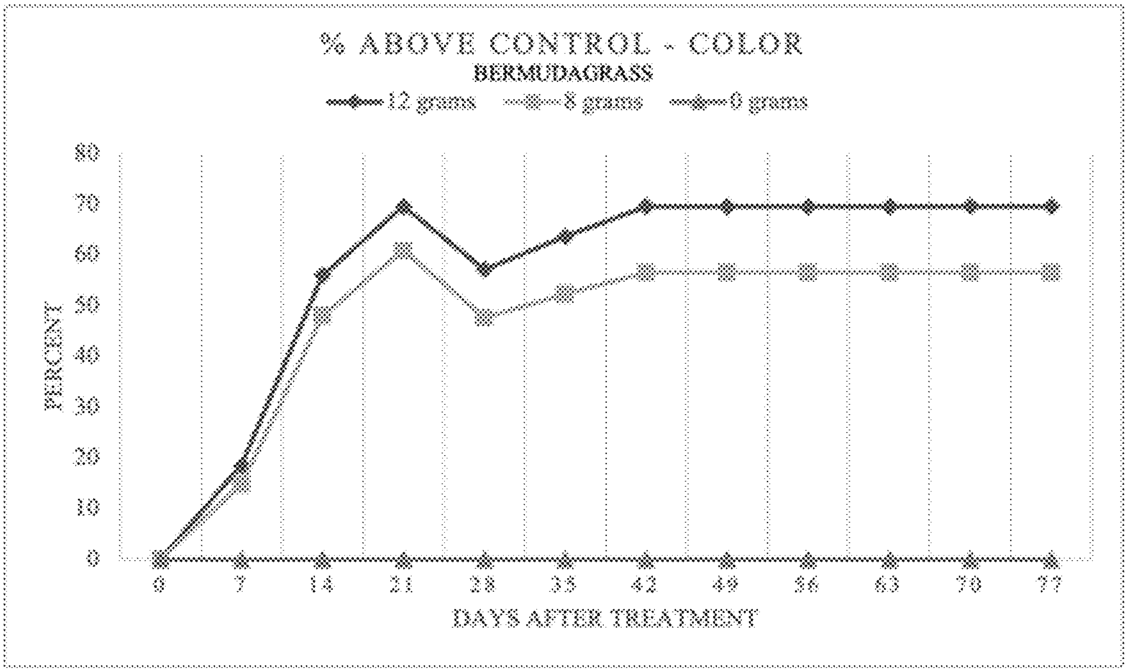
FIG. 13 is a graphical representation showing the different treatments of Bermuda grass plotted by percent above control versus days after treatment in one example.
Figure 14:
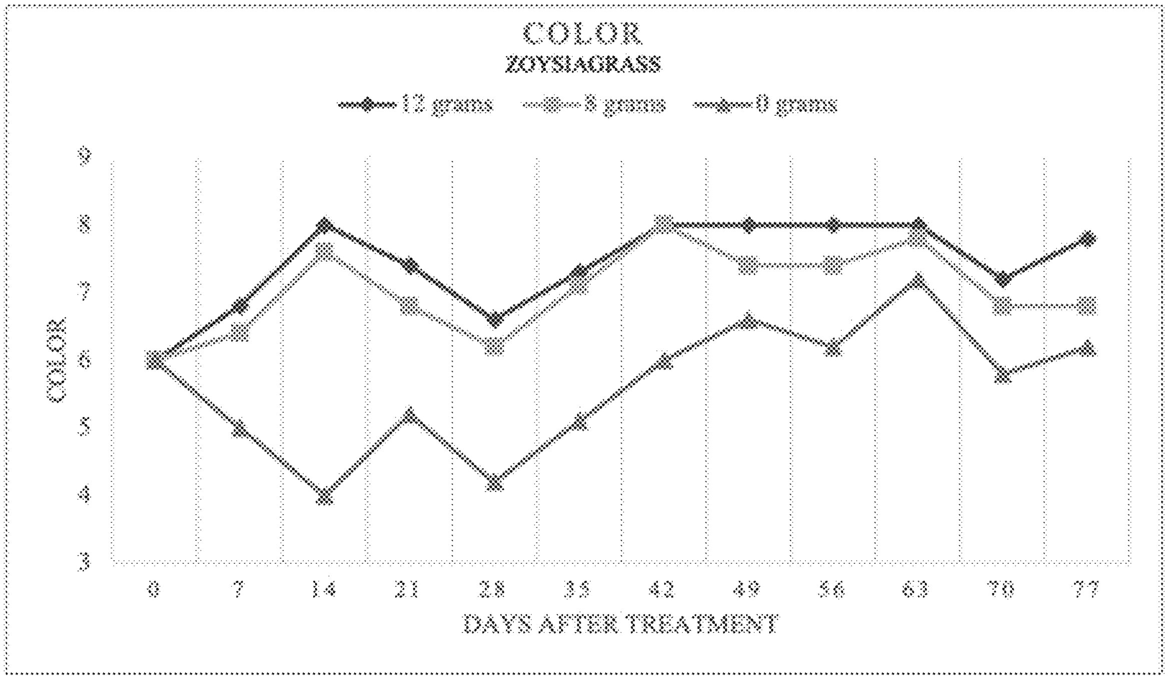
FIG. 14 is a graphical representation showing the different treatments of *Zoysia* grass plotted by color versus days after treatment in one example.
Figure 15:
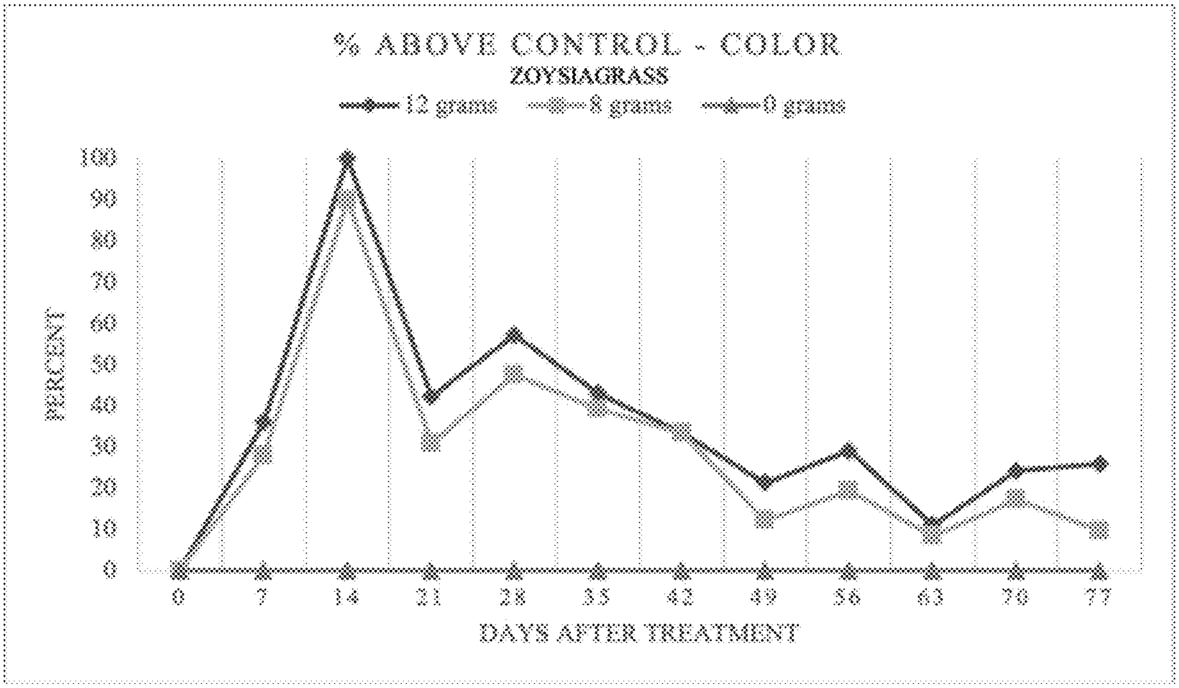
FIG. 15 is a graphical representation showing the different treatments of *Zoysia* grass plotted by percent above control versus days after treatment in one example.

Example 2 shows the effects of fertilizer pod use on the color of various turfgrass species. The experimental design is the same as described in Example 1. A visual color rating using a 1 through 9 scale with 6 representing minimal acceptable quality for a lawn was used to rate the level of green color of the plant leaves. The rating were taken weekly for 11 weeks. FIG. 10 shows color ratings throughout the 11 week trial for St. Augustine grass. FIG. 11 shows the percentage above the untreated control for color in St. Augustine grass. FIGS. 12 and 13 show the same data for Bermuda grass while FIGS. 14 and 15 show similar date for *zoysia* grass. Differences between the 8 gram, 12 gram and non-fertilized treatments were significant. The 12 gram fertilizer treatment outperformed the 8 gram fertilizer treatment throughout the entire 11 week trial and across all three plant species. Plant color is used as an indicator of slow-release fertilizer availability to the plant. The nutrients provided by the fertilizer pod invention are shown to have slow-release characteristics by providing stable, consistent plant nutrition for an extended period of time. In all tests, color ratings increased from the plant date when treated with the fertilizer pod while the color ratings of the untreated plants all showed a decline in color. The fertilizer pod treatments maintained superior color throughout the entire 11 week trial, proving that plant nutrients provided by the fertilizer pods were still available in the soil. These color effects lasted the full 11 weeks, with larger differences seen through week 7. This example shows the longevity of the fertilizer pod in the soil and its capacity to feed plants up to and beyond 45 days after planting.

Example 3

Figure 17:
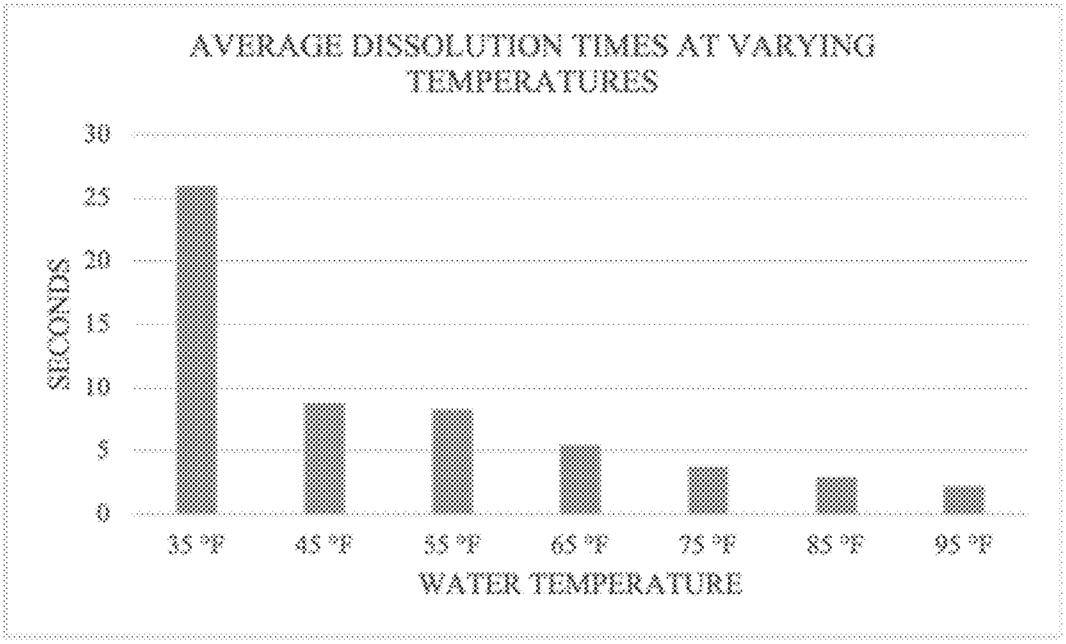
FIG. 17 is a graphical representation showing the average dissolution times at various temperatures in representative examples.

Example 3 shows the dissolution times of the PVOH water soluble film utilized in the fertilizer pod. The encapsulated fertilizer pod is capable of immediate solubility and subsequent release of specifically designed, slow-release nutrients and other fertilizer components. FIG. 16 shows the data for fertilizer pod dissolution time in varying water temperatures. These water temperatures represent the range of temperatures encountered when planting containerized plants. FIG. 17 is a graphical representation of the data.

The preceding description contains significant detail regarding the novel aspects of the present invention. It should not be construed, however, as limiting the scope of the invention but rather as providing illustrations of the preferred embodiments of the invention. For example, the blend of fertilizer granules may be made up of different proportions of fertilizer granules. Thus, the scope of the invention should be fixed by the following claims, rather than by the examples given.

We claim:

1. An encapsulated fertilizer, capable of dissolving when exposed to an amount of water, comprising:

a pod formed by a cold water-soluble polyvinyl alcohol (PVOH) film capable of dissolving at water temperatures above 32 degrees Fahrenheit within 30 seconds of exposure to water, wherein said pod is sealed to form a compartment, wherein said compartment is fully encapsulated by said pod on all sides and contains an amount of slow-release fertilizer granules, wherein said slow-release fertilizer granules provide controlled nutrient release over a period of at least 45 days following dissolution of said pod.

2. The encapsulated fertilizer of claim 1, wherein each fertilizer granule of said amount of fertilizer granules has a sieve grading number of 100 SGN to 200 SGN.

3. The encapsulated fertilizer of claim 1, wherein each fertilizer granule of said amount of fertilizer granules has an aspect ratio that is dissimilar to 1.

4. The encapsulated fertilizer of claim 1, wherein said water-soluble material is a film capable of dissolving within at least 10 seconds of being exposed to said amount of water when said amount of water has a temperature above 65 degrees Fahrenheit.

5. The encapsulated fertilizer of claim 1, wherein said amount of fertilizer granules has a salt index of less than 40.

6. The encapsulated fertilizer of claim 1, wherein said amount of fertilizer granules includes an amount of humic granules.

7. The encapsulated fertilizer of claim 1, wherein each fertilizer granule of said amount of fertilizer granules is in a stable, non-leachable form.

8. The encapsulated fertilizer of claim 1, wherein said amount of fertilizer granules include at least three nutrients, including nitrogen, phosphorous and potassium.

9. The encapsulated fertilizer of claim 1, wherein said amount of fertilizer granules are selected to target turfgrass plants to promote optimal growth.

10. The encapsulated fertilizer of claim 1, wherein each fertilizer granule of said amount of fertilizer granules is sparged with a carboxylic acid formulation to increase fertilizer use efficiency.

11. The encapsulated fertilizer of claim 1, wherein said amount of fertilizer granules are encapsulated in said pod by a process of thermoforming.

12. An encapsulated fertilizer, capable of dissolving when exposed to an amount of water, comprising:

an amount of slow-release fertilizer granules selected to target a specific type of plant, wherein said amount of slow-release fertilizer granules are encapsulated in a pod, wherein said pod is formed by an upper outer wall and a lower outer wall sealed together along a single seal line, wherein said upper outer wall and said lower outer wall are formed from a cold water-soluble polyvinyl alcohol (PVOH) film capable of dissolving at water temperatures above 32 degrees Fahrenheit within 30 seconds of exposure to water, wherein said slow-release fertilizer granules provide controlled nutrient release over a period of at least 45 days following dissolution of said pod.

13. The encapsulated fertilizer of claim 12, wherein said upper outer wall and said lower outer wall are formed from a water-soluble film.

14. The encapsulated fertilizer of claim 13, wherein each fertilizer granule of said amount of fertilizer granules has an aspect ratio that is dissimilar to 1.

15. The encapsulated fertilizer of claim 13, wherein said water-soluble material is a film capable of dissolving within at least 10 seconds of being exposed to said amount of water when said amount of water has a temperature above 65 degrees Fahrenheit.

16. The encapsulated fertilizer of claim 12, wherein each fertilizer granule of said amount of fertilizer granules has a sieve grading number of 100 SGN to 200SGN.

17. The encapsulated fertilizer of claim 12, wherein said amount of fertilizer granules has a salt index of less than 40.

18. The encapsulated fertilizer of claim 12, wherein said amount of fertilizer granules includes an amount of humic granules.

19. The encapsulated fertilizer of claim 12, wherein each fertilizer granule of said amount of fertilizer granules is in a stable, non-leachable form.

20. The encapsulated fertilizer of claim 12, wherein said amount of fertilizer granules include at least three nutrients, including nitrogen, phosphorous and potassium.

21. The encapsulated fertilizer of claim 12, wherein each fertilizer granule of said amount of fertilizer granules is sparged with a carboxylic acid formulation to increase fertilizer use efficiency.

22. The encapsulated fertilizer of claim 12, wherein said amount of fertilizer granules are encapsulated in said pod by a process of thermoforming.

* * * * *